United States Patent [19]
Zakim et al.

[11] Patent Number: 5,891,619
[45] Date of Patent: Apr. 6, 1999

[54] SYSTEM AND METHOD FOR MAPPING THE DISTRIBUTION OF NORMAL AND ABNORMAL CELLS IN SECTIONS OF TISSUE

[75] Inventors: David S. Zakim, Armonk; Luis Chiriboga, Carmel; Max Diem, Croton-On-Hutson, all of N.Y.; Ping Xie, Morris Plains, N.J.

[73] Assignee: InPhoCyte, Inc.

[21] Appl. No.: 782,424

[22] Filed: Jan. 14, 1997

[51] Int. Cl.⁶ .............................. G06K 9/00; G01N 33/48; G01N 33/574
[52] U.S. Cl. .................................. 435/4; 436/63; 436/64; 435/7.23; 382/128; 382/133; 382/165; 382/170; 382/194
[58] Field of Search .................................. 435/1, 4, 7.23; 356/300; 436/63, 64; 382/128, 133, 165, 170, 194

[56] References Cited

U.S. PATENT DOCUMENTS 5,072,382 12/1991 Kamentsky ........................ 364/413.08

FOREIGN PATENT DOCUMENTS 9303672 4/1993 WIPO.

OTHER PUBLICATIONS

Rigas, B. et al. 1990. PNAS USA 87:8140–8144.

Frank, C.J. et al. 1995. Anal. Chem. 67:777–783.

Hawi Sr. et al. 1996. Cancer Letter 110:35–40.

Wong, P.T. 1995. Canadian J. Applied Spectroscopy. 40(6):143–151.

Grasselli, J.G. et al. 1993. J. Mol. Structure 294:207–210.

*Primary Examiner*—Toni R. Scheiner
*Attorney, Agent, or Firm*—Hale and Dorr LLP

[57] ABSTRACT

A system and method is described for permitting the simultaneous automated collection of data with regard to the presence of diseased cells, in particular neo-plastic, dysplastic or cancerous cells, or normal cells at a given site in a section of tissue. This is accomplished according to the following steps. First, IR spectral data are collected simultaneously for each cell or pixel of the tissue. Next, these data are analyzed by identifying the cell types encountered in the sample by comparing them with reference data sets for healthy and diseased cells. Finally, a false color mapping of the distribution of different types of cells in the tissue section is presented that permits assessment of the prevalence of diseased cells.

10 Claims, 5 Drawing Sheets

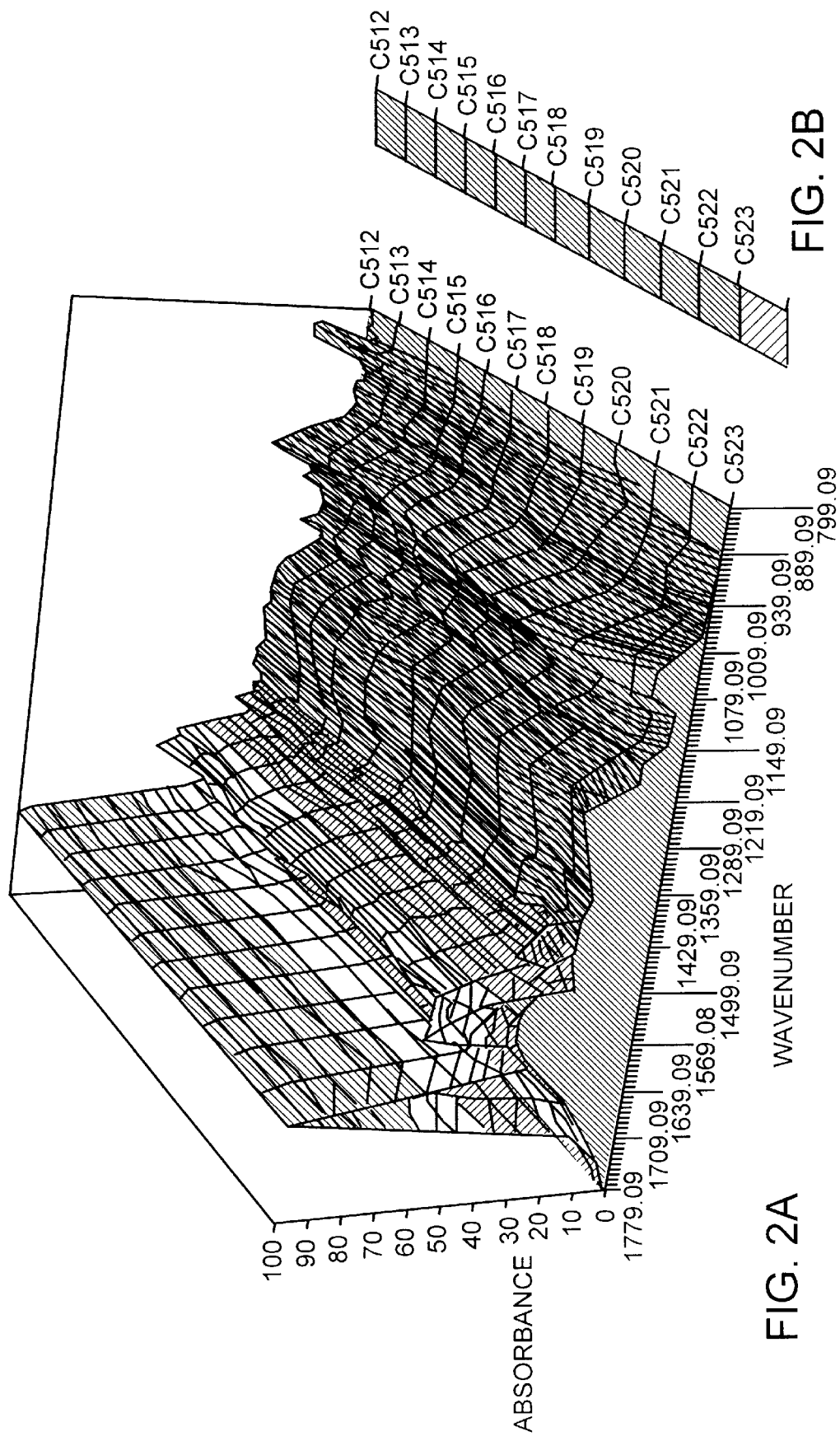

SYSTEM AND METHOD FOR MAPPING THE DISTRIBUTION OF NORMAL AND ABNORMAL CELLS IN SECTIONS OF TISSUE

FIELD OF THE INVENTION

The present invention relates to a system and methods for determining the heterogeneity of cells in tissue samples. More specifically, the present invention describes a system and methods for determining the distribution and location of normal and abnormal cells at the surface, or anywhere in a contiguous piece of tissue sample, or in separate cells disposed on a suitable substrate.

BACKGROUND OF THE INVENTION

Cancer, and a cure for it, are at the forefront of medical research throughout the world. However, the efficacy of treating cancer has changed little in the last four decades. Some of the daunting issues with regard to cancer are that there are many different types and each has its own characteristics. Moreover, many of these different types of cancer are being diagnosed more frequently as the population ages.

The cost of treating cancer on a case-by-case basis is staggering. Much of this cost is reflected by the high technology approaches being used now to treat cancer, such as bone marrow transplantation. It has been found, however, that the overall treatment cost for cancer can be drastically reduced if the cancer is detected early, or at a pre-cancerous state, when it is more susceptible to treatment.

When cancer is identified at the earliest stages, for example prior to its invasion of tissue, it is generally treatable. To illustrate, the advantage of finding tumors while they are small is that they can be completely removed surgically. However, as the primary tumor grows in size, there are local extensions away from it and the ability of the surgeon to remove all the tumor and diseased tissue decreases drastically. Therefore, the smaller the tumor, the more likely the success in treating it.

In determining how to treat a particular cancer, it is also important to stage (or grade) it, at the microscopic level, in tissue removed at the time of surgery. The purpose of examining the resected tissues in this way is to determine, at the microscopic level, the extent of the local spread of the cancer, whether the margin between the resected cancerous mass and the presumably healthy tissue that is left behind is free of cancer, and/or whether there is spread of cancer cells to regional lymph nodes. The microscopic level examination of tissues removed in surgery is an index of whether or not cancer cells have spread beyond the primary cancerous mass and the cancer is likely to grow again, either locally or at distant sites.

The microscopic examination of cancerous tissue and the tissue surrounding it that is believed normal tissue, hopefully will provide information as to whether there is local extension of the primary cancerous mass. This examination also provides a road map to determine which tissue in the patient may still be affected. The microscopic examination of lymph node tissue in the area around the cancerous mass, that typically is resected with the cancerous mass, is a factor in determining the success of the surgery and the therapy to subsequently treat the patient.

For example, in colon cancer, which is the second most common cancer in the United States and the developed world, the prognosis for success is directly related to the extent to which cancer cells penetrate the luminal surface of the colon into (or through) the colon wall. For a given depth of cancer cell penetration into the colon wall, the prognosis degrades as the number of regional lymph nodes with cancer cells increases. The relationships between the local extent of cancer and post-surgery prognosis apply to most cancers, e.g., breast, prostate, head, and neck cancer. As such, the staging of cancer by microscopic level examination of tissues removed during surgery is an important part of the medical treatment of cancer patients.

Presently, the staging of cancer is performed by microscopic level examination of the removed tissue. This method does not provide sufficient accuracy to predict the likelihood that cancer has spread beyond the immediate site of the primary tumor. Thus, it does not provide assurance that all the cancer cells have been removed from the patient. Obviously, there needs to be a practical way to obtain such information.

There is only a general relationship between prognosis and the extent of the local extension of cancers; however, this relationship is not absolute. Frequently, local and/or distant (metastatic) recurrences of cancers occur in patients whose tissue sections have margins that appear free of cancer cells as do the regional lymph nodes. The inability to properly stage cancer based on examination of the removed tissue results in the cancer cure rates being quoted in terms of long-term survival, e.g., 5 or even 10 years of disease free time after surgery.

Pathologists who examine the removed tissue have no adequate means to determine whether all the cancer was in fact removed from the patient. Moreover, they do not have a method to accurately stage the tissue that they have. In attempts to derive the needed accuracy for the staging process, pathologists have developed morphologic criteria to hopefully enhance the accuracy of predicting the biologic behavior of cancers. This process was intended to distinguish between small, apparently contained cancers that will not recur and those cancers that will recur. The prediction of recurrence of the cancer is based of the morphology of the cancer cells and how they are organized. This method for predicting the outcome also has not been successful.

The classification of cancer cells on the basis of their content of DNA and other biochemical measurements of cancer cells have not augmented significantly the predictive value of examining resected cancer tissues. As such, one of the conundrums of oncology and pathology is the well-known phenomena that some cancers behave aggressively to kill the patient while others that appear very similar, which may be found in the same organ, behave in a relatively benign way, i.e., they do not recur after the primary cancerous mass is removed.

Once surgery is completed to remove a cancerous mass, it normally is believed that no more cancerous tissue or cells remain. However, there is a high probability that all the cancer cells have not been removed; therefore, all post-surgical patients may be treated as if they still have cancer cells in their body. This is the case even when a pathology report of the resected tissue suggests that this is not so. The result of this is that a number of patients are treated unnecessarily with toxic drugs because physicians do not know how to identify the exact patients who have cancer cells remaining and who do not.

The poor predictive power of pathological examination of resected tissue may be founded on the fact that there are features of the growth and spread of cancer that are not understood. Moreover, it also may be founded on the fact that the current methods of pathology, which entail the subjective, microscopic examination of stained sections of tissues removed from patients, have proven to be incapable of identifying with any significant degree of accuracy whether or not cancer cells are present in tissues.

Cancer is a disease that evolves in a staged process. This is shown in FIG. 1. In FIG. 1, normal cell 100 will evolve to cancer cell 110 after going through dysplastic stage at 104 and neoplastic stage at 108. The cells at 104 refer to cells that have minimal changes due to pre-cancer. The neoplastic grade at 108 refers to cells that have moderate stages of pre-cancer. Such diagnoses alert the clinician that pre-cancer exists and that some type of treatment of the pre-cancer is needed to cure the condition and prevent the ultimate evolution of frank cancer. As would be understood, the identification of the developmental precursors to cancer cells would present the early detection of cancer. Treatment of cancer at this stage would prevent the evolution of these cells to frank cancer. Unfortunately, current technologies for detecting early stages of pre-cancer are neither sensitive nor specific.

As indicated, microscopic examination of tissues can fail to detect cancer cells. Moreover, current techniques of microscopic level examination of cells and tissues also can fail to detect cells that are intermediate stages of the evolution of normal cells to frank cancer.

The medical community has known for a long time the type of information that is needed to make more accurate and earlier diagnoses of cancer in examining tissue and cells. However, what has not been dealt with is how to obtain this information in an efficient and cost effective manner.

Research has established that the presence or absence of disease in cells and tissues is based on whether molecules are normal in-structure and whether a normal distribution of molecules is present in a given type of cell. This has led physicians to recognize that accurate diagnoses of disease may be based on a gathering and an evaluation of information at the molecular level in cells. As such, it has now become essential to perform molecular level analysis to diagnose diseases, like cancer, at early stages for the accurate detection of specific types of disease through the examination of cells and tissues.

There are two approaches to obtaining molecular level information regarding the presence or absence of disease in cells. The first uses molecular probes that search chemically for specific abnormal molecules. The second is to test for normal and abnormal molecules by measuring their interactions with electromagnetic radiation. The latter method is referred to as spectroscopy.

Spectroscopy has some advantages over the use of chemical or molecular probes in that spectroscopy can make measurements without prior knowledge of the exact type of abnormality present. Further, results from spectroscopy may be obtained faster than when probes are used. It also has been surmised that vibrational spectroscopy is the most useful type for examination contemplated in the present invention. However, vibrational spectroscopic techniques have not been used for diagnosing disease.

Having resolved that vibrational spectroscopic techniques are useful for diagnosing disease, it becomes necessary to provide a method to practically apply those techniques. In order to apply vibrational spectroscopic techniques, it is principally necessary to understand the spectral characteristics of the cells that are being analyzed.

Normal tissue contains many different types of cells. Each type of cell performs a different function. Abnormal tissue will contain a heterogeneous population of abnormal cells and normal cells. The abnormal cells are derived from the tissue itself or are cells that are not normally found in the tissue. An example of cells that are present in tissue that were not derived for that tissue are inflammatory cells which may accumulate in or around cancerous tissue, or metastases of other cancers.

Cells acquired from a region of tissue may contain several cell types, and thus, such a sample will not be homogeneous. The heterogeneity of this sample may result in spectral information which is not indicative of the information that is potentially available from a single cell because any spectral analysis will involve the average of spectra of different types of cells or the spectra of cells with non-cellular elements in the tissue. Similarly, information about a disease encoded within the molecules of a single cell that is mixed with a heterogeneous population of other isolated cells will also suffer degradation of the information by the averaging of spectra over a range of different types of cells. Therefore, the achievement of the desired accuracy through the use of vibrational spectroscopy will depend on collecting spectra from small elements in tissue that are known to be homogeneous.

It is then possible to map tissue elements by illuminating small areas, or pixels, of tissue sections using an infrared microscope, one pixel at a time. However, this method is time consuming, labor intensive, and requires a skilled operator to move the focus of the microscope to adjacent areas of a sample. Noting these problems, there is a need of a system and method that will permit the collection of spectral data at relatively high speed from many contiguous areas, or pixels, of a tissue sample simultaneously and that will map the distribution of abnormal and normal cells in a tissue sample.

SUMMARY OF INVENTION

The present invention is a system and method for mapping the distribution of abnormal and normal cells in a tissue sample and for analyzing the spectral information acquired from such cells. The map will provide the location and an identification of abnormal and normal cells in a tissue sample. The system and method permit the automatic collection and analysis of data collected so that a diagnosis of tissue may be made.

The present invention is used for working, for example, with sections of tissue cut from blocks of tissue obtained by biopsy. The present invention also may be used for cell-by-cell or multicell examination of a sample obtained by aspiration or any other exfoliation method.

The system and method of the present invention permit the continuous automated collection of data with regard to the presence or absence of diseased cells, pre-neoplastic cells, or normal cells at a given site in a section of tissue. This is accomplished according to the following steps. First, IR spectral data are collected simultaneously for each cell or pixel of the tissue. Next, these data are analyzed by identifying the cell types encountered in the sample by comparing them with reference data sets for healthy and diseased cells. Finally, a false color map of the distribution and location of different types of cells in the tissue section is presented that permits assessment of the prevalence of diseased cells.

An object of the present invention is to provide a system and method for determining the distribution and location of abnormal and normal cells in a tissue sample.

Another object of the present invention is a system and method for determining the distribution and location of abnormal and normal cells in a tissue sample using vibrational spectroscopy.

A further object of the present invention is a system and method to determine the distribution and location of abnormal and normal cells in a tissue sample in an automated manner using vibrational spectroscopy that generates spectra of the examination of each cell or number of cells.

These and other objects of the invention will be described in detail in the remainder of the specification referring to the drawings.

BRIEF DESCRIPTION OF DRAWINGS

FIG. 2A is a stack plot and FIG. 2B is a linear tissue map for normal epithelium.

DESCRIPTION OF THE INVENTION

Figure 1:
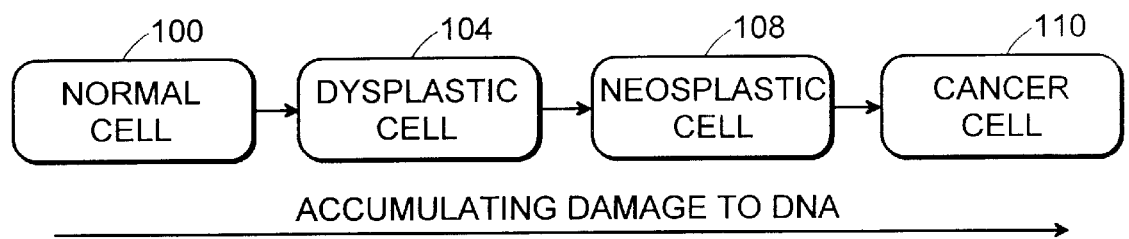
FIG. 1 is a diagram of Scheme I for the development of frank cancer.

The present invention has demonstrated that the failure of traditional methods of pathology to predict the outcome of cancer may be overcome by improved methods for detecting cancer in resected tissues. The present invention permits the detection of otherwise undetectable cancer cells that remain after surgery. The recurrence of cancer at sites distant from the primary cancer, in patients with so-called negative or normal regional lymph nodes, in large part is due to the presence of undetectable cancer cells in the regional nodes. These methods will enhance the accuracy of staging the state of development of cancer in a given patient. This, in turn, enhances the clinician's ability to determine the extent of cancer at the time of surgery to prognosticate more accurately in given patients post-operatively, and to make the best possible decisions for treating individual patients.

The present invention is a system and method for mapping the location of abnormal and normal cells in a tissue sample, or a sample of exfoliated cells, so that accurate analysis of the presence or absence of disease in such cells can take place. According to the present invention, sections of tissues cut from blocks of tissue obtained by biopsy are examined. The examination is either cell-by-cell, or groups of cells in tissue, or large numbers of detached cells, such as exfoliated cervical cells. In either case, the method yields maps of the locations of the cells, and an identification of the cells using vibrational spectroscopic techniques (infrared multichannel microscopy or Raman multichannel microscopy).

The system and method of the present invention permit the continuous automated collection of data with regard to the presence or absence of diseased cells, pre-neoplastic cells, or normal cells at a given site in a section of tissue. This is accomplished, as described above, by collecting simultaneously for each cell or pixel of the tissue, the infrared or Raman spectral data and by identifying the cell types encountered in the sample by comparing them with reference data sets for healthy and diseased cells. Finally, a false color mapping of the distribution of different types of cells in the tissue section is presented that permits assessment of the prevalence of diseased cells. In carrying out the present invention, a Fourier transform infrared spectrometer is used. This spectrometer is attached to an optical microscope that focuses an infrared beam on a sample of tissue in order to provide the method for collecting a vibrational spectrum in the mid-infrared or the near infrared region. In the remainder of the specification, Data Acquisition, Determination of Dysplasia, and Data Presentation according to the present invention will be discussed separately. Lastly, specific examples of the present invention will be discussed.

Data Acquisition

Pursuant to the present invention, infrared mapping of the tissue or cell sample is achieved via a simultaneous data acquisition procedure that uses an infrared array detector. A linear, rectangular, or quadratic infrared array detector containing between 50 and 1000 detector elements may be used for data acquisition. These array detectors may have pixels measuring about 30 $\mu$m on edge. The image of the tissue sample may be focused with or without magnification onto the array detector, depending on the spatial resolution desired.

Each pixel of the array detector is exposed simultaneously to infrared radiation that has passed through a section of tissue. The infrared radiation passing through the tissue is intensity modulated by the interferometer before impinging on the pixels of the array detector. A detector element of about 30 $\mu$m×30 $\mu$m in size corresponds to the size of large cells; thus, in a direct imaging system (without magnification or demagnification), a tissue section of about 1 mm×1 mm can be analyzed in one exposure with single cell spatial resolution.

The issues involved with data sampling now will be discussed. In general, interferograms are collected at path differences between the fixed and moveable mirrors, of between 1–4 fringes of the He—Ne reference laser (316, 632, or 1264 nm), depending on the size of the interferogram desired (16k, 8k, or 4k, respectively). In standard single detector interferometric Fourier transform infrared (FTIR) spectrometers, the data acquisition is triggered by the laser fringe signal. The light intensity experienced by the detector at the time of the laser trigger is digitized and stored in a one-dimensional array (4k, 8k, or 16k size) for Fourier processing after a scan of the interferometer is completed.

For a small size array detector, for example, a linear 64 pixel array detector that is presently commercially available, the detector can be read out, pixel by pixel, using standard rapid-scan interferometry, using relatively slow mirror velocities. The data are stored in a matrix that has 64 columns with each consisting of 4k, 8k or 16k data points. For large size detector (1,000 pixels or so) arrays, the present invention will utilize step scanning Fourier Transform ("SSFT") technology. In SSFT, the moveable mirror of the interferometer is moved in small, discrete steps, and kept at a constant position between these steps. At each of these fixed mirror positions, the output of all array elements is digitized and stored in a matrix in which a given row corresponds to the 1000 intensity values produced by each pixel. The next 1000 intensity values due to the next mirror position are stored in the next row. This procedure is repeated until the scan is complete. Thus, each column in the matrix contains the interferogram experienced by one pixel. Spectral data are obtained by performing a fast Fourier transform (FFT) for each of the 1000 columns of the matrix. This results in a complete infrared spectrum collected at each pixel position. This information is stored and optionally converted into a map of infrared absorption intensities corresponding to the pixel positions, and the position of the cells in the tissue section (vide infra).

SSFT interferometers are capable of stepping the mirror at rates of about 0.01 to 50 Hz. At the fastest scan rate, there will be 20 msec between consecutive mirror steps. During this time, the detector elements sample the interferogram before they are read. Their output is digitized into a 4k interferogram of data points for each of the 1000 detector elements. This data matrix can be generated in approximately 80 seconds at the very fastest stepping rate.

An alternative method, using Raman vibrational spectroscopy, will now be discussed. According to the present invention, a pulsed laser in the near infrared or visible ranges of the light spectrum may be used to excite a Raman vibrational spectrum. Excitation is carried out using a microscope. The Raman scattered light is detected via a CCD array detector that is coupled to a dispersive device. The CCD detects the Raman scattered light. The data manipulation strategies discussed previously may be used as well when Raman microscopy is used.

Determination of Dysplasia

The determination of dysplasia in cells from spectra obtained using the procedures and methods described previously now will be described. At the outset of the analysis, the reference spectra associated with the present application are identified. For example, in the case of a patient with colon cancer, the analysis program loads as reference spectra the data sets obtained for normal colonic epithelial cells, inflammatory cells, and various dysplastic stages of colon tissue. Similarly, for the analysis of cervical tissue, spectral patterns for healthy and dysplastic basal, parabasal, intermediate, and superficial layers are loaded. Next, the spectral data collected for each pixel are compared by computer to determine whether it corresponds to the reference categories of cells. This analysis may be carried out in a variety of ways, as for example, by determining the best fit of the spectrum of the unknown pixel with the reference spectra characteristic of the different types of cells.

The vibrational spectra of each pixel examined is analyzed to identify whether a given cell is normal or cancerous; in addition, a measure of the heterogeneity in the spectral properties of adjacent pixels is established since precancerous tissue was found to be characterized by a high degree of heterogeneity at the tissue surface. The spectrum of each pixel is also used to search for cell types foreign to the tissue being studied, for example for inflammatory cells or metastases of other cancers.

If the cell being examined is an abnormal epithelial cell, its spectrum will not be identified as either a normal epithelial cell or an inflammatory cell. Computer analysis then proceeds to identify the type of cell from the point of view of determining the extent to which the cell deviates in its progression from a normal cell to a preneoplastic (dysplastic cell) to frank cancer cell.

Data Presentation

The data obtained, as described in previous sections, is a map of complete spectra recorded simultaneously for each cell or pixel in the sample. The computer may drive a display which will provide a false color map to show the distribution of different types of cells in the tissue sample. This may be accomplished in the following manner.

The results of the tissue identification by cell types, described above, can be summarized by assigning each identified cell type a color code. Since the position of each pixel exhibiting this particular cell type is known, a map can be constructed that displays the position of the identified cell types by their assigned color codes. This makes it possible to readily identify the distribution of the distinct cell types in the tissue section or cell preparation. Separately from the mapping function, the computer stores the relative distribution of different types of cells in the tissue section.

Examples

Referring to FIGS. 2A, 2B, 3A, 3B, 4, and 5, examples of one-dimensional tissue scans to identify variations in cell types will be discussed. FIG. 2A shows a stack plot of the infrared absorption spectra of adjacent pixels, about 75 $\mu m \times 75 \mu m$ in size. In FIG. 2A, the X-axis, the wavenumber axis, is marked 799 to 1799 $cm^{-1}$, and the Z-axis, the absorbance axis, is marked in arbitrary units from 0 to 100. The spectra of consecutive pixels marked C512–C523 are plotted along the Y-axis. FIG. 2B, is a one-dimensional false color map obtained from the data in FIG. 2A.

The data in FIG. 2A is displayed to demonstrate the repeatability of certain spectral patterns from one pixel to the next. The sensitivity associated with the map towards variation of the cell type examined, or the occurrence of disease, is very high. In interpreting FIG. 2A, the last two pixels contain a piece of parabasal tissue that folded over the superficial layer. This change in tissue types is apparent in the spectral trace marked C523, which is very different from all others. As such, it is concluded that infrared microscopy is a sensitive method for the identification of healthy tissue types, and for the differentiation of the layers of cells in healthy epithelial tissue.

Figures 3A, 3B:
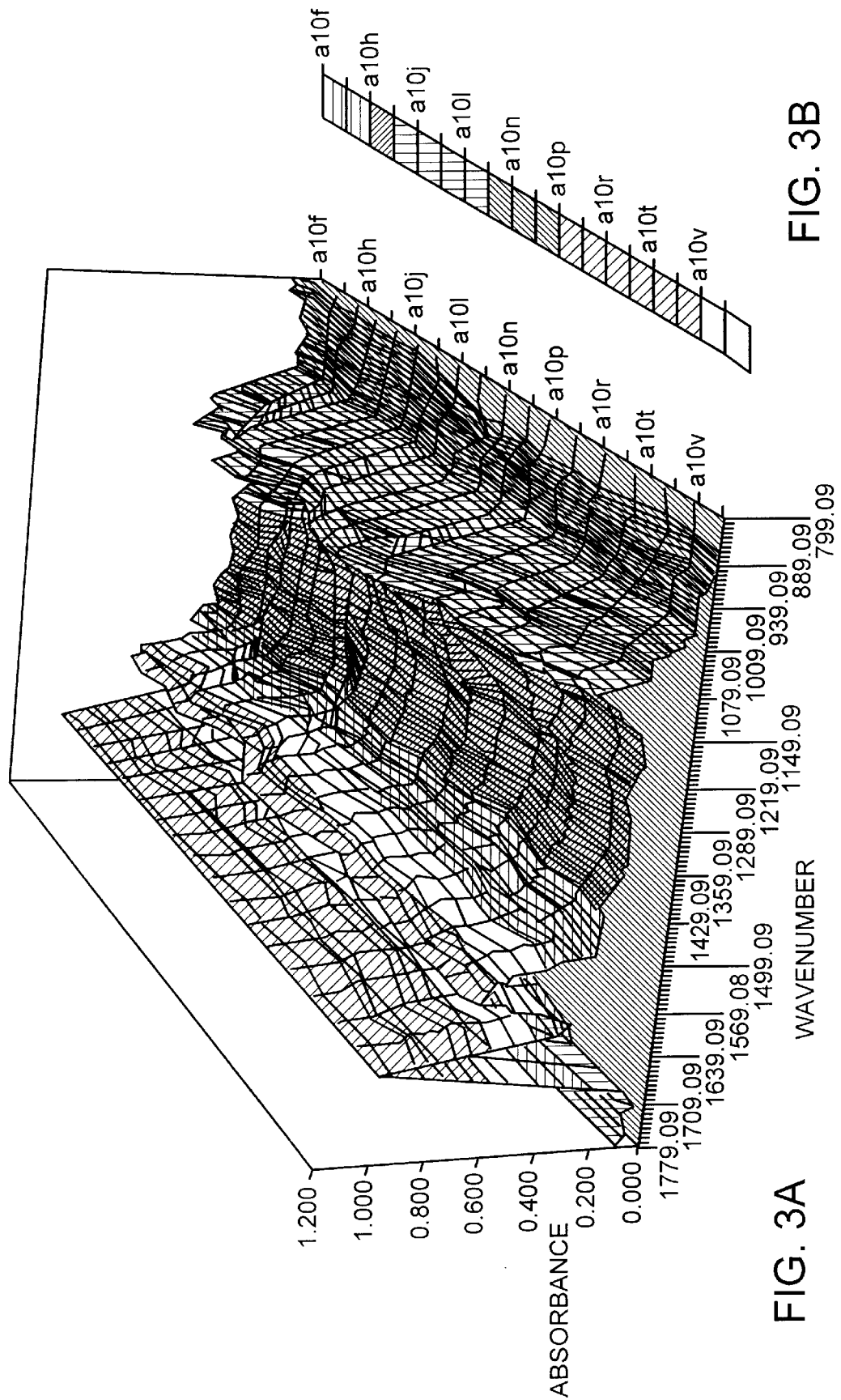
FIG. 3A is a stack plot and FIG. 3B is a linear tissue map for dysplastic tissue.
Figure 4:
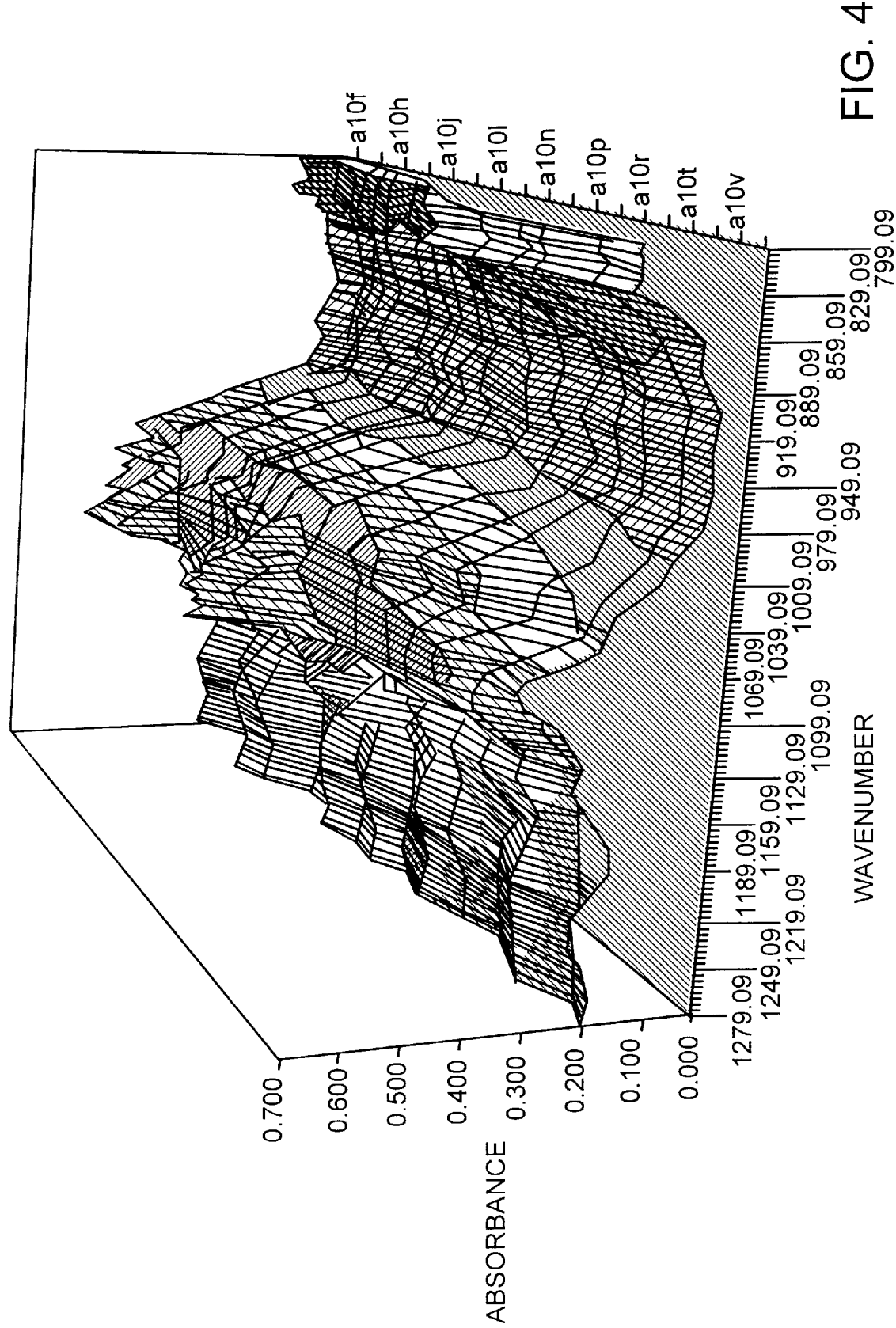
FIG. 4 is a tissue map of the low frequency region in the second tissue map shown in FIG. 3.

FIG. 3A shows a different tissue map than is shown in FIG. 2. The map in FIG. 3 is obtained from dysplastic tissue. The stack plot of spectra in FIG. 3A presents the spectral traces of 18 adjacent pixels along the surface. In this Figure, it is readily seen that the variations in the spectral patterns are much larger than those shown in FIG. 2A. FIG. 4 shows more clearly the variations that occur in the low frequency region (800–1300 $cm^{-1}$). As seen in FIG. 3A and more clearly in FIG. 4, there are large spectral changes in this tissue section, even though the spectra were taken from adjacent pixels. This is interpreted as showing that the superficial layer has large variations of the cell types and the spectra are quite abnormal as compared with those of a normal tissue map. In addition, the variations in the 18 spectra shown in FIG. 3A, 3B, and 4 indicate that even in moderately dysplastic tissue, the surface shows large degree of heterogeneity. This is shown very clearly by the linear false color map in FIG. 3B.

Figure 5:
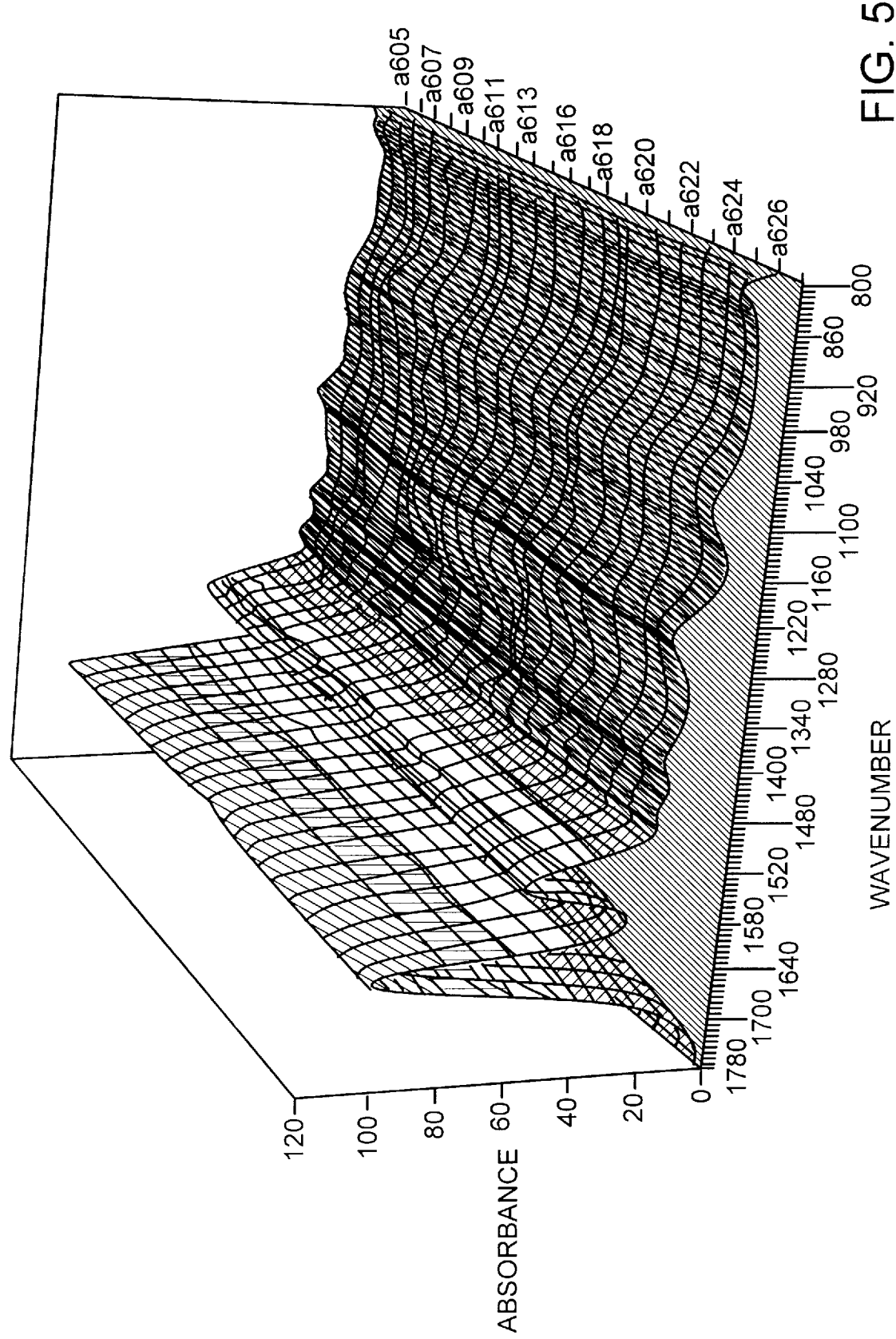
FIG. 5 is a stack plot and a linear tissue map for a tissue with carcinoma-in-situ.

Referring to FIG. 5, a stack plot of spectra is shown for a tissue section diagnosed to have carcinoma-in-situ ("CIS"). This tissue map shows very little variations. In fact, all of the spectra shown for the CIS sample show virtually the same spectral pattern, although the spectral pattern is not correct for what typically is at the superficial layer. Interpreting the map in FIG. 5 leads to the conclusion that at this level of disease, the superficial cells are all very similar and exhibit the spectral characteristics of cells normally found in the basal layer.

The samples in FIGS. 2A, 2B, 3A, 3B, 4, and 5 graphically demonstrate the ability of the present invention to provide the described information regarding the distribution of abnormal and normal cells in a tissue sample.

The terms and expressions which are used herein are used as terms of expression and not of limitation. There is no intention in the use of such terms and expressions of excluding the equivalents of the features shown and described, or portions thereof, it being recognized that various modifications are possible in the scope of the present invention.

We claim:

1. A method for mapping normal and abnormal cell types in a tissue sample, comprising steps of:
   (a) imaging each of the cells, or groups of cells, onto a discrete element of a detector array with each element of the detector array being sensitive to predetermined wavelengths of light;
   (b) collecting from each discrete detector array element an intensity pattern for distinct modulation patterns created by an interferometer;
   (c) generating frequency spectra for each discrete detector element based on the detected intensity patterns at step (b);
   (d) comparing the frequency spectra generated for each discrete detector array element in step (c) with a file of spectra representative of a plurality of different cell types and matching each spectra generated at step (c) with spectra from the file;
   (e) generating a unique representation for each separate cell type matched at step (d); and
   (f) displaying the unique representations of the spectra matched at step (e) in predetermined relationships based on the map locations determined at step (b).

2. The method as recited in claim 1, wherein one cell is associated with a discrete element of the detector array.

3. The method as recited in claim 1, wherein the illuminating step includes the use of infrared microscopy.

4. The method as recited in claim 1, wherein the illuminating step includes using Raman microscopy.

5. The method as recited in claim 1, wherein spectra are obtained using vibrational microscopy.

6. A method for generating a false color map of the distibution and location of normal and abnormal cell types in a tissue sample, comprising steps of:
   (a) imaging each of the cells, or groups of cells, onto a discrete element of a detector array with each element of the detector array being sensitive to predetermined wavelengths of light;
   (b) collect from each discrete detector array element an intensity pattern for distinct modulation patterns created by an interferometer;
   (c) generating frequency spectra for each discrete detector element based on the detected intensity patterns at step (b);
   (d) comparing the frequency spectra generated for each discrete detector array element in step (c) with a file of spectra representative of a plurality of different cell types and matching each spectra generated at step (c) with spectra from the file;
   (e) generating a unique representation for each separate cell type matched at step (d);
   (f) assigning a color code to each separate cell type matched by step (d); and
   (g) displaying the unique represtations of the spectra matched at step (e) in predetermined relationships based on the map locations determined at step (b) in a false color map.

7. The method as recited in claim 6, wherein at least two cells are associated with at least one discrete element of the detector array.

8. The method as recited in claim 6, wherein the illuminating step includes the use of infrared microscopy.

9. The method as recited in claim 6, wherein the illuminating step includes using Raman microscopy.

10. The method as recited in claim 6, wherein spectra are obtained using vibrational microscopy.

* * * * *